US011929773B2

(12) United States Patent
Venkateswaran et al.

(10) Patent No.: US 11,929,773 B2
(45) Date of Patent: Mar. 12, 2024

(54) METHOD AND CONTROL DEVICE FOR MITIGATING INTERFERENCE

(71) Applicant: Telefonaktiebolaget LM Ericsson (PUBL), Stockholm (SE)

(72) Inventors: Vijay Venkateswaran, Västerås (SE); Fredrik Huss, Sundbyberg (SE); Mark Wyville, Ottawa (CA); Bo Göransson, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 346 days.

(21) Appl. No.: 17/593,382

(22) PCT Filed: Mar. 20, 2019

(86) PCT No.: PCT/SE2019/050250
§ 371 (c)(1),
(2) Date: Sep. 17, 2021

(87) PCT Pub. No.: WO2020/190185
PCT Pub. Date: Sep. 24, 2020

(65) Prior Publication Data

US 2022/0158673 A1 May 19, 2022

(51) Int. Cl.
*H04B 1/10* (2006.01)

(52) U.S. Cl.
CPC .................................. *H04B 1/1027* (2013.01)

(58) Field of Classification Search
CPC .................................................... H04B 1/1027
See application file for complete search history.

(56) References Cited

U.S. PATENT DOCUMENTS 6,061,568 A * 5/2000 Dent .................... H04W 72/541 455/114.2
6,118,805 A * 9/2000 Bergstrom .......... H04L 27/0012 370/208

(Continued)

FOREIGN PATENT DOCUMENTS

CN 107453782 A 12/2017
EP 2 926 480 6/2014
WO 2017 157461 A1 9/2017

OTHER PUBLICATIONS

PCT International Search Report issued for International application No. PCT/SE2019/050250—dated Jan. 7, 2020.

(Continued)

*Primary Examiner* — Hsinchun Liao
(74) *Attorney, Agent, or Firm* — BAKER BOTTS L.L.P.

(57) ABSTRACT

There is provided mechanisms for mitigating interference in a network node. A method is performed by a control device (200). The method comprises receiving (S102) radio signals comprising at least one desired signal and interference, estimating (S104) a characteristic of the interference, wherein the estimation comprises calculating correlation statistics of power levels of frequency sub-bands comprising the interference with frequency sub-bands comprising the received radio signals. The method comprises determining (S106) an interference suppression matrix to suppress the interference in the frequency sub-bands of the received radio signals based on the estimated characteristic of the interference, wherein the interference suppression matrix is further determined based on information from inter-band interference observed across distinct sub-bands of the received radio signals. The method comprises applying (S108) the interference suppression matrix on the received radio signals to mitigate the interference from the received radio signals.

21 Claims, 9 Drawing Sheets

(56) References Cited

U.S. PATENT DOCUMENTS

| | | | | |
|---|---|---|---|---|
| 9,825,794 | B2 | 11/2017 | Nguyen | |
| 2003/0053524 | A1* | 3/2003 | Dent | H04B 1/7115 370/335 |
| 2007/0161361 | A1* | 7/2007 | Vaisanen | H04L 25/03159 455/302 |
| 2015/0257165 | A1 | 9/2015 | Gale et al. | |
| 2017/0353929 | A1 | 12/2017 | Tacconi et al. | |
| 2018/0248576 | A1 | 8/2018 | Coe et al. | |

OTHER PUBLICATIONS

PCT Written Opinion of the International Searching Authority issued for International application No. PCT/SE2019/050250—dated Jan. 7, 2020.

* cited by examiner 12
subcarriers
1 slot
6 PRBs 1.4 MHz
Sub-band
multiple PRBs
Slot 10
0 ms
Slot 1
0.5 ms
PRB 99
DC
PRB 0
Wide band
Multiple PRBs
or
multiple bands 901
901
Radio
Radio
902
902
Multi antenna interference suppression
W
904
F
F
$F_2^H$
$F_2^H$
Multi antenna/channel Blind interference suppression –variant 1
FFT
FFT
905
Extract user
906
IRC/MRC
IRC/MRC
909
909
FDE, decoder
FDE, decoder
907
907
User data
User data
908
908
900

901
901
Radio
Radio
FFT
FFT
Extract user
910
IRC/MRC
910
IRC/MRC
+
–
+
–
FDE, decoder
FDE, decoder
User data
912
User data
912
Multi antenna interference suppression
F
F
W
911
914
Multi-channel postprocessing
Multi antenna/channel Blind interference suppression –variant 2
1000

METHOD AND CONTROL DEVICE FOR MITIGATING INTERFERENCE

PRIORITY

This nonprovisional application is a U.S. National Stage Filing under 35 U.S.C. § 371 of International Patent Application Serial No. PCT/SE2019/050250 filed Mar. 20, 2019 and entitled "Method and Control Device for Mitigating Interference" which is hereby incorporated by reference in its entirety.

TECHNICAL FIELD

The proposed technology presented herein relates to a control device and methods for mitigating interference in a network node.

BACKGROUND

Interference is an annoying issue in most networks, since it disrupts or modifies a signal. In the presence of non-linear behavior, received uplink (UL) signals can be contaminated with interference resulting from the interaction of the downlink signals due to the non-linear behavior. The distortion signal causing the contamination will impact the uplink signal quality. The non-linear behavior can be caused by the non-linear components and passive components that exhibit non-linear behavior which may be for example a power amplifier, a diode or a low noise receiver. The non-linear behavior can be caused by passive components that exhibit non-linear behavior. Interference caused by strong downlink (DL) signals mixing with passive components is called passive intermodulation (PIM) interference. Since PIM is a critical limitation for performance it has motivated several PIM suppression solutions. Most of the existing solutions assume that the receiver has full knowledge of the PIM signal seen and cancels them at the receiver.

While existing solutions have proposed approaches that trade-off "performance" i.e. cancelling number of PIM terms and non-linear products versus "computation complexity" i.e. multiplications, additions etc—most of them deal with interference or PIM where the disturbing DL signals are known. Suppressing interference or PIM when the DL signals are unknown is a complicated problem, since intermodulation spread transmit signals from multiple bands.

The nature of PIM observed at the receiver depends on PIM sources, number of non-linear terms, varying site configurations, multi-antennas and multi-carrier/band combinations. It is reasonable to assume that there will always be an unknown element of interference that needs to be accounted for in the uplink.

Hence, there is a need for an improved method to be able to efficiently handle interference when the downlink signal is unknown.

SUMMARY

It is an object to provide procedures to handle interference in a resource-efficient manner. This and other objects are met by embodiments of the proposed technology. There are, proposed herein, various embodiments which address one or more of the issues disclosed herein.

According to a first aspect, there is provided a method for mitigating interference in a network node. The method is performed by a control device. The method comprises receiving radio signals comprising at least one desired signal and interference. The method comprises estimating a characteristic of the interference, wherein the estimation comprises calculating correlation statistics of power levels of frequency sub-bands comprising the interference with frequency sub-bands comprising the received radio signals. The method comprises determining an interference suppression matrix to suppress the interference in the frequency sub-bands of the received radio signals based on the estimated characteristic of the interference, wherein the interference suppression matrix is further determined based on information from inter-band interference observed across distinct sub-bands of the received radio signals. The method comprises applying the interference suppression matrix on the received radio signals to mitigate the interference from the received radio signals.

According to a second aspect, there is provided a control device for mitigating interference in a network node. The control device is configured to receive radio signals comprising at least one desired signal and interference. The control device is configured to estimate a characteristic of the interference, wherein the estimation comprises calculating correlation statistics of power levels of frequency sub-bands comprising the interference with frequency sub-bands comprising the received radio signals. The control device is further configured to determine an interference suppression matrix to suppress the interference in the frequency sub-bands of the received radio signals based on the estimated characteristic of the interference, wherein the interference suppression matrix is further determined based on information from inter-band interference observed across distinct sub-bands of the received radio signals. The control device is further configured to apply the interference suppression matrix on the received radio signals to mitigate the interference from the received radio signals.

According to a third aspect, there is provided a control device for mitigating interference in a network node. The control device comprises processing circuitry. The processing circuitry is configured to cause the control device to estimate a characteristic of the interference, wherein the estimation comprises calculating correlation statistics of power levels of frequency sub-bands comprising the interference with frequency sub-bands comprising the received radio signals. The processing circuitry is configured to cause the control device to determine an interference suppression matrix to suppress the interference in the frequency sub-bands of the received radio signals based on the estimated characteristic of the interference, wherein the interference suppression matrix is further determined based on information from inter-band interference observed across distinct sub-bands of the received radio signals. The processing circuitry is configured to cause the control device to apply the interference suppression matrix on the received radio signals to mitigate the interference from the received radio signals.

According to a fourth aspect, there is provided a computer program product comprising a non-transitory computer readable medium storing instructions which when executed by a computer, cause the computer to perform the method according to the first aspect.

According to a fifth aspect there is presented a computer comprising instructions which, when executed by a computer, cause the computer to perform the method according to the first aspect. The computer readable storage medium could be a non-transitory computer readable storage medium.

According to a sixth aspect there is presented a non-transitory computer-readable storage medium storing instruction which, when executed by a computer, cause the computer to perform the method according to the first aspect.

Advantageously the proposed technology offers the possibility to provide an optimal matrix to maximize signal to interference plus noise ratio (SINR) and improving the overall capacity. Further this also provides an algorithm that minimize the means square error, MMSE, between the actual and estimated received radio signal. Moreover, it also does not need the interference to be synchronized with the desired uplink signal.

Other objectives features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Throughout the drawings, the same reference designations are used for similar or corresponding elements. Any step or feature illustrated by dashed lines should be regarded as optional.

Figure 1A:
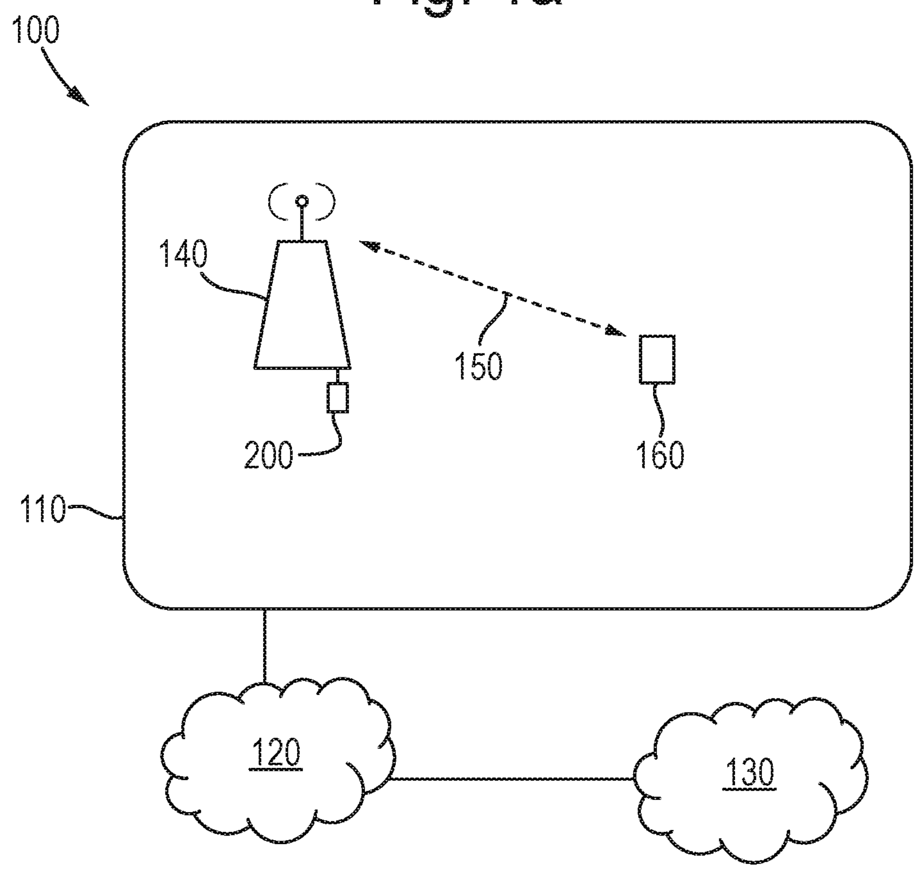
FIG. 1*a* is a schematic diagram illustrating a communications network according to embodiments.

FIG. 1*a* is a diagram that illustrates a communications network 100 where embodiments presented herein can be applied. The communications network 100 could be a third generation (3G) telecommunication system, a fourth generation (4G) telecommunication system or sometimes also called Long Term Evolution (LTE), or a fifth (5G) telecommunication system or also called New Radio (NR) and support any 3GPP telecommunications standard, where applicable.

The communications network 100 comprises a control node 200 (control device) configured to control a radio base station 140 that provides network access to at least one terminal device 160 in a radio access network 110, thus enabling the terminal device 160 to communicate over a wireless link 150. The radio access network 110 is operatively connected to a core network 120. The core network 120 is in turn operatively connected to a service network 130, such as the Internet. The terminal device 160 is thereby enabled to, via the network node, access services of, and exchange data with, the service network 130.

Some examples of radio base stations 140 are radio access network nodes, radio base stations, base transceiver stations, Node Bs, evolved Node Bs (e Node Bs), g Node Bs, access points, access nodes, transmission and reception points, and backhaul nodes. Some examples of terminal devices 160 are wireless devices, mobile stations, mobile phones, handsets, wireless local loop phones, user equipment (UE), smartphones, laptop computers, tablet computers, network equipped sensors, network equipped vehicles, and so-called Internet of Things devices.

LTE and NR use orthogonal frequency-division multiplexing (OFDM) in both downlink, i.e. from a network node, g Node B, e Node B, or base station, to a user equipment (UE), and in uplink, i.e. from UE to g Node B, where both discrete Fourier transform spread OFDM (DFT-spread OFDM) and OFDM are supported. OFDM uses frequency carriers of certain width and in such frequency carriers, it can dynamically use certain sub-carriers.

Figure 1B:
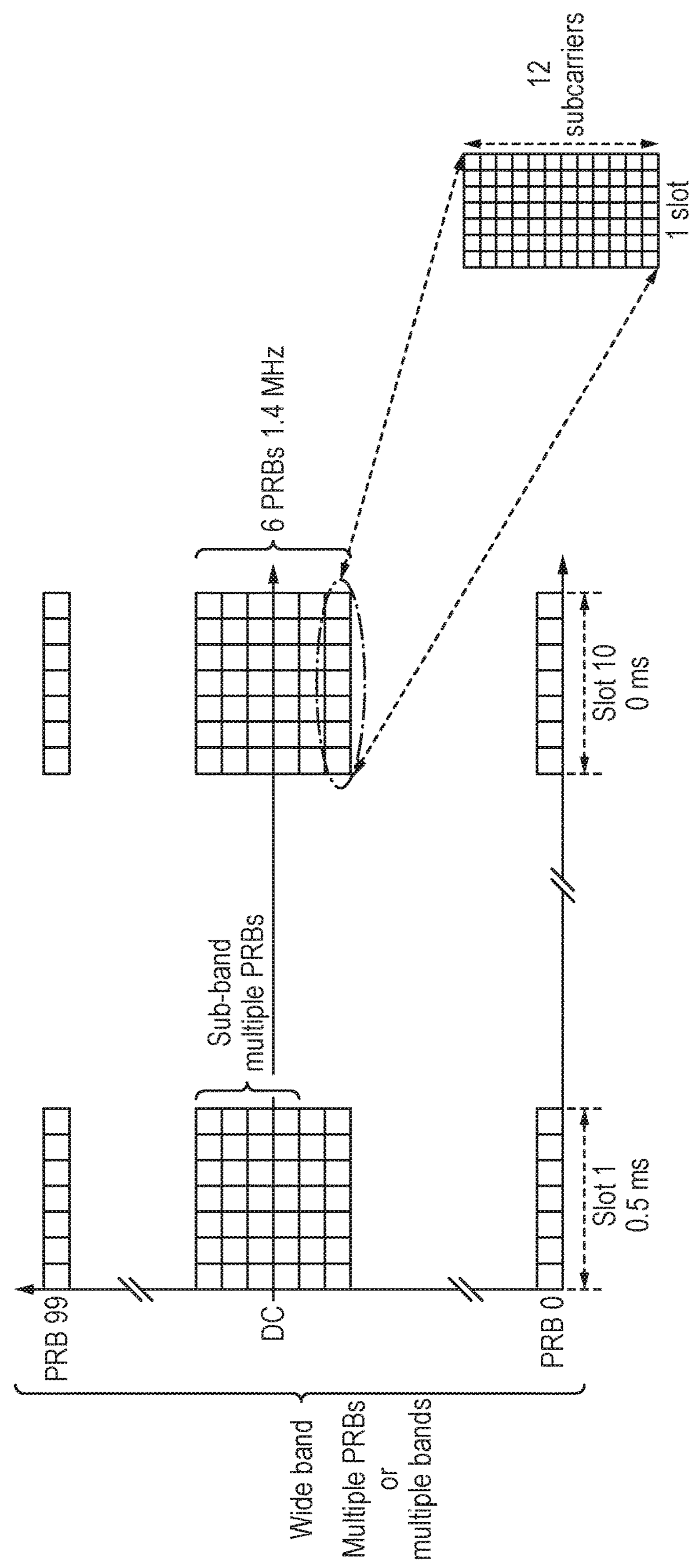
FIG. 1*b* is schematically illustrating an example of a frame structure.

FIG. 1*b* is illustrating an example of LTE frame structure, where each frame is made of sub-frames, which in turn comprise of slots and physical resource blocks (PRBs). Each physical resource block is made of 12 sub-carriers. Sub-band comprises of multiple PRBs, where in some cases all the uplink users are scheduled. Alternatively, the sub-band may also comprise of multiple PRBs that are corrupted by PIM signal and not used to schedule desired uplink signal. Wide-band typically corresponds to the entire 10 MHz/20 MHz bandwidth.

The control node 200 might comprise, be collocated with, integrated with, or be in operational communications with, the radio base stations 140. The control node may herein also be called a control device.

Figure 2:
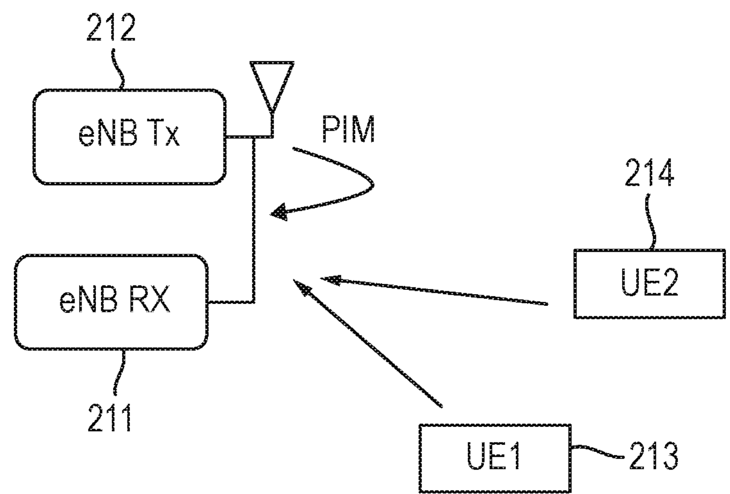
FIG. 2 is schematically illustrating an interference scenario according to an embodiment.

With reference to an embodiment shown in FIG. 2, an example of an uplink (UL) communication setup is illustrated, where a base station or a network node is receiving signals from a set of UEs 213, 214 and passive intermodulation (PIM), from a combination of transmit signals from same or adjacent network nodes. PIM is herein an example of an interference and PIM will be described in the following examples. A transmit unit 212 and a receive unit 211 may be located in the same network node or it may be a transmit unit and receive unit located in respective nodes being adjacent network nodes. In some cases, there may be PIM leaking from other units. Thus, as may be seen in FIG. 2, PIM is leaking in the DL from the transmit unit 212 to the receive unit 211 and is disturbing the communication in the UL.

Figure 3:
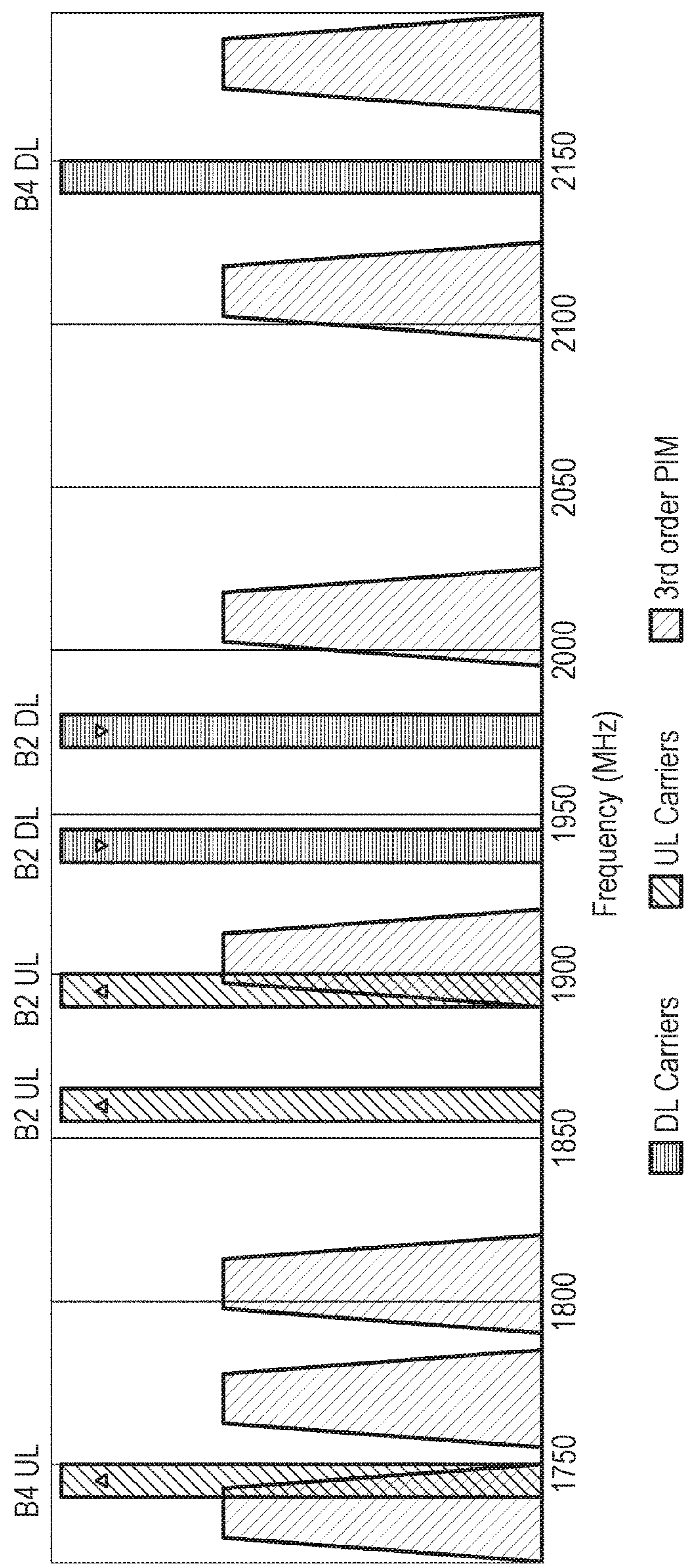
FIG. 3 is illustrating an example of downlink sub-bands leading to third order PIM in the uplink sub-bands.

FIG. 3 is illustrating an example of a scenario with just two frequency bands, frequency bands 2 and 4 at a given site. The signals from the downlink frequency bands are combined at the radio base station and around, leading to PIM which leaks into the uplink frequency bands. Thus, the frequency bands 2 and 4 in the DL can lead to PIM in both band 2 and band 4 of the UL bands. This PIM may here be calculated for the third order intermodulation products. In the example in FIG. 3, the DL frequency band 2 (B2) and band 4 (B4) around 1940, 1975, 2150 MHz provides third order intermodulation products disturbing the frequency bands at 1740, 1770, 1800 and 1900 MHz in the UL bands B2 and B4. This is quite annoying. Thus, there is a need for a solution to be able to mitigate interference in a network node. The embodiments disclosed herein employ a solution to mitigate interference when the downlink signal is unknown.

At least some of the embodiments disclosed herein relate to mechanisms for ensuring that interference can be mitigated. The embodiments disclosed herein in particular relate to mechanisms for calculating and applying a matrix to suppress the interference. In order to obtain such mechanisms, there is provided a control device 200 for mitigating the interference, a method performed by the control device 200, a computer program product comprising code, for example in the form of a computer program, that when run on a control device 200, causes the control device 200 to perform the method. This interference may herein be PIM.

Figure 4:
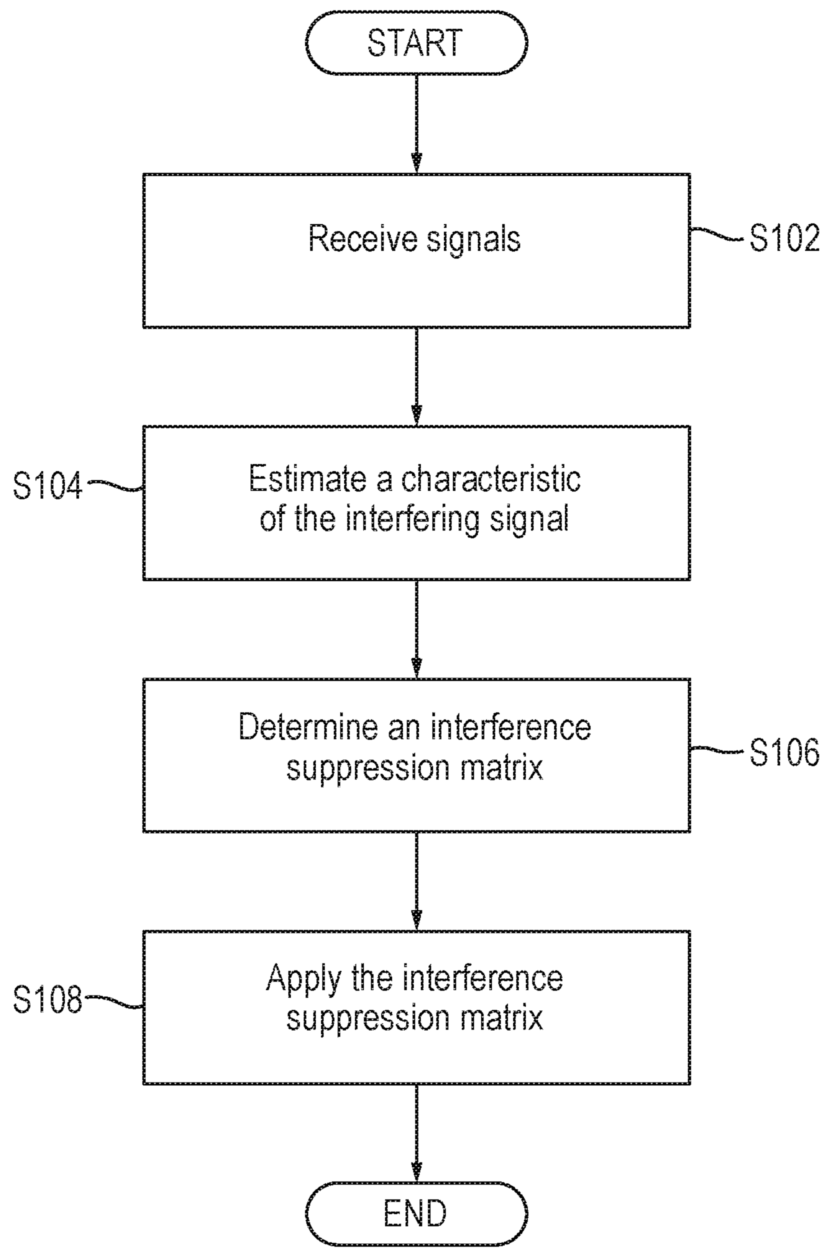
FIG. 4 is a flow chart of methods according to embodiments.

FIG. 4 is a flowchart illustrating preferred embodiments of methods for mitigating interference in a network node. The methods are performed by a control device 200. The methods are advantageously provided as computer programs 1120.

S102: The control device 200 obtains or receives radio signals comprising at least one desired signal and interference. This desired signal may be an uplink signal.

S104: The control device 200 estimates a characteristic of the interference, wherein the estimation comprises calculating correlation statistics of power levels of frequency sub-bands comprising the interference with frequency sub-bands comprising the received radio signals.

S106: The control device 200 determines an interference suppression matrix to suppress the interference in the frequency sub-bands of the received radio signals based on the estimated characteristic of the interference, wherein the interference suppression matrix is further determined based on information from inter-band interference observed across distinct sub-bands of the received radio signals. By "distinct sub-bands" is hereby meant individual sub-bands such that the interference is observed over individual sub-bands.

S108: The control device 200 applies the interference suppression matrix on the received radio signals to mitigate the interference from the received radio signals.

Advantageously, this technique provides an efficient way of suppressing unknown interference and PIM without having knowledge of the transmitted signals (as DL signals that may cause the PIM interference). The technique is also agnostic to the serving base station. This may therefore be called a blind solution.

By the term interference is hereby meant interference appearing from intermodulation products as well as intercell interference, multi-user interference, intentional jammers, interference from one unknown source radiating signals in same frequencies but also from several unknown source/reflections, and it may include one or several interfering signals as for example PIM signals. The interference may also stem from systems such as broadcast systems, other communications systems or by faulty equipment not fulfilling the spectral mask. In this disclosure, the interference will be described with examples of passive intermodulation, PIM interference.

Embodiments relating to further details of mitigating this interference in a network node performed by the control device 200 will now be disclosed.

In the following, some aspects of the system setup will be presented. The uplink signals (UL) are not expected to occupy the entire UL bandwidth and the network node knows the physical resource blocks (PRBs) or sub-bands scheduled by the UL to communicate with the radio base station. Moreover, the downlink signals can have arbitrary load.

In the disclosed system, we denote the time domain signals received across the entire band using an N×1 vector z(t). This signal z(t) N×1 vector comprises of unknown uplink desired radio signal r(t) (occupying specific set of PRBs or sub-bands that are known at eNB), unknown wideband PIM/residual interferer p(t) and noise n(t).

$$z(t)=r(t)+p(t)+n(t)$$

Note that the unknown UL desired signal r(t) is here considered to occupy only a part of the overall frequency band at a given time. The objective herein is to estimate and suppress the unknown PIM signal p(t) along the PRB's or sub-bands that contain the uplink desired signal r(t).

In short, according to embodiments, for the disclosed system an interference suppression matrix is presented operating on the received radio signals z(t) to estimate and suppress/subtract the PIM or interference signal p(t) from the uplink signal. This interference suppression matrix may be a PIM suppression matrix. Here, the PIM suppression matrix takes different snapshots of the PIM corrupted received signal and predicts the PIM contributions along the desired sub-band of operation. It may for example be a PIM suppression matrix that takes different snapshots of the PIM corrupted received signal and predicts the PIM contributions along the desired sub-band of operation. The criterion for such optimization techniques can be to either a) improve the overall signal to interference ratio (or the signal to intermodulation ratio or the signal to PIM ratio) or b) to reduce the overall mean squared error (MMSE) between the undesired interference (which may be PIM) and its estimate. The first a) may be seen as a matched interference or PIM suppressor operating on z(t) and the second b) may be a MMSE interference or PIM suppressor.

More specifically in detail, when designing the suppression matrix in this system, first a training part is needed. Now a non-limiting example for a sub-band 1 and sub-band 2 will be described. It is appreciated that for more sub-bands this may be simplified as sub-band x and sub-band x complement. Herein throughout this disclosure PIM will be described as an example of interference.

Let $p_1(t)$ and $p_2(t)$ denote PIM contributions along the sub-band 1 and sub-band 2 respectively at a given time t of the overall PIM signal p(t): p(t) $p_1(t)+p_2(t)$. See FIG. 5*a*. Note that during snapshot 1 501, the uplink signals from UE r(t) is present in the sub-band 1 501 and corrupted by PIM signal $p_1(t)$ along sub-band 1 501. This is done to extract correlation of PIM in sub-band 2 502. Additionally, sub-band 2 502 is corrupted by the PIM signal $p_2(t)$. The received radio signals partitioned along sub-bands can be seen in time and frequency domain as $$Fz(t)=F_1(r(t)+p_1(t))+F_2p_2(t)\Leftrightarrow z[f]=\{r[f]+p_1[f]\}+p_2[f]$$

where $F=[F_1; F_2]$ is an N×N Fourier transform matrix containing columns of N-point Fourier transform sub-matrices $F_1$: M×N matrix denoting sub-band 1 and $F_2$: K×N matrix containing remaining columns of Fourier transform. r(t) is the unknown uplink radio signal.

To be able to understand the interference, there is a need to characterize the interference by an estimation. Some embodiments will now be disclosed how this is performed.

According to an embodiment, the estimation may comprise correlating the received radio signals across the entire frequency band with frequency shifted versions of itself to get the spectral representation of the received radio signals. This is performed by determining a covariance matrix. Thus, the estimation may be performed by computing the covariance between the received radio signals across the entire frequency sub-band. In other words, each desired signal may be correlated with frequency shifted versions of the desired signal and each interference may be correlated with frequency shifted versions of the interference to provide a spectral representation of the received radio signals.

According to another embodiment, the estimation may further comprise correlating the interference from each of the distinct sub-bands with each of the received radio signals across the entire band to get the spectral representation of the interference. Thus, by correlating interference in each sub-band with each of the desired signal and the interference across the entire band, the spectral representation of the interference may be provided. Therefore, the estimation of the characteristics of the interference depends on the spectral representation from both the interference and the received radio signals.

Note that the UL desired signals are independent of the interference (or the PIM signals). When cross-correlating the PIM signals from a distinct sub-band 2 with the overall received radio signals across the entire band it will provide the spectral relationship of PIM present in sub-band 2. This representation is computed as the cross-correlation matrix $$R_{zp[x]}=E\{z[f]p_x^H[f]\} \text{ which is an } N\times K \text{ matrix}$$

where $p_x[f]$ is the interference or PIM, z[f] denote the frequency-domain signals received across the entire band, x are 1, 2, 3, . . . n sub-bands, and E denotes the mathematical expectation.

For sub-band 2 the cross-correlation matrix then is $$R_{zp[2]}=E\{z[f]p_2^H[f]\}$$

The spectral relationship of interference (or PIM) and the desired UL signals along distinct sub-bands is specified by the N×N covariance matrix $R_{zz}=E\{z[f]z^H[f]\}$ Thus, this equation represents the relationship of frequency shifted versions of the received radio signals.

It is appreciated that, the term "received radio signals" may herein include the interference and the desired UL signals. The term "statistics" may herein refer to statistical information of received radio signals.

Note that this operation may be performed in the background during the reception phase, and we do not need dedicated training resources to obtain the spectral signature of PIM.

Figure 5A:
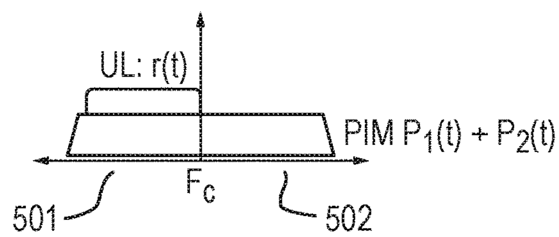
FIG. 5*a* is illustrating an estimation of the uplink signal statistics with a frequency/power diagram according to embodiments.

FIG. 5*a* discloses the characterization and estimation of uplink signal statistics according to embodiments. In this example, snapshot 1 (phase 1) 501 discloses that the uplink signal occupies sub-band 1 501 of the entire band and PIM disturbs the entire band, which is here both sub-band 1 501 and the sub-band 2 502.

Figure 6A:
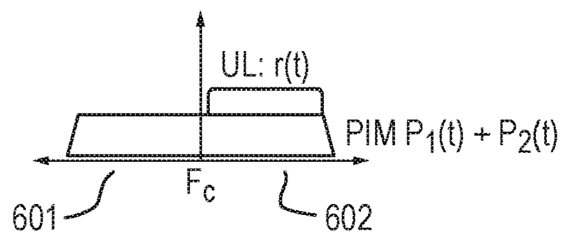
FIG. 6*a* is illustrating an estimation of the uplink signal statistics with a frequency/power diagram according to embodiments.

FIG. 6*a* discloses in a similar way as in FIG. 5*a* the characterization and estimation of uplink signal statistics according to embodiments. In this example, snapshot 2 (phase 2) discloses that the uplink signal occupies sub-band 2 602 of the entire band and PIM disturbs the entire band, both sub-band 1 601 and the sub-band 2 602.

Thus, it is quite clear that here PIM interfere and disturb the communication in the desired uplink signal. This disturbance is mitigated by the embodiments disclosed herein.

According to an embodiment, the inter-band or inter-carrier (sub-carrier) interference may be estimated from the loss in orthogonality of the received radio signals. This is especially valid for scenarios, where the interference is asynchronous to the desired uplink signal. Thus, in the case of preserving the orthogonality of the received radio signals, the covariance matrix obtained from the received radio signals in the time domain would be a circular matrix and in the frequency domain it would be a diagonal or a block-diagonal (for a multi-antenna case). Due to inter-carrier interference, the covariance is not necessarily orthogonal due to that the uplink signal being corrupted by interference (PIM). In other words, as we take the received radio signals and estimate covariance and cross-correlation, then the frequency domain matrix will not be diagonal.

The term "orthogonal" may herein refer to that sub-carrier signals are orthogonal to each other.

Moreover, after estimating the characteristics, the next step is to minimize a cost function and calculate the suppressor matrix. Embodiments of how to compute this suppression matrix will now be disclosed.

According to an embodiment, the determination of the interference suppression matrix may be performed by minimizing a mean square error, MMSE between the received radio signals and the estimation of the interference.

In the non-limiting example of sub-band 1 and 2, based on the observations of z[f] of phase 1, which in turn processes PIM related to sub-band x, where x=2, minimizing the cost function is specified by the MMSE criterion of PIM:

$$\mathcal{J}=\min_W E\|p_x(t)-F_x^H W^H z[f]\|^2$$

where W is an N×K PIM suppression matrix and p is interference, $F_x$ is a Fourier transform of a K×N matrix for arbitrary sub-bands x={1, 2, 3, . . . }. $W=R_{zz}^{-1}R_{zp[x]}$ where $R_{zz}$ is an N×N matrix and $R_{zp[x]}$ is an N×K matrix, with N sub-carriers divided into K sub-carriers.

When computing the partial derivative of the above expression with respect to W and equating it to zero it leads to the optimal W minimizing the mean squared error $W_2=R_{zz}^{-1}R_{zp[2]}$. The optimal $W_2=R_{zz}^{-1}R_{zp[2]}$ follows Wiener-Hopf Criterion.

Here, the PIM of transmit signals p(t) is uncorrelated with the UL received signal from UEs, r(t) i.e. $E\{r(t)\bar{p}(t)\}\approx 0$. This means that the term $R_{zp[2]}=E\{z[f]p_2^H[f]\}$ does not contain components of the received signal r(t). Thus, using the above expression to design and cancel the PIM components may not degrade the desired part of r(t).

The distortion due to PIM is inherently non-linear and the operation can be interpreted as spreading exponentials of signals in the frequency domain. This would destroy the orthogonality of the OFDM waveform. If orthogonality had been preserved, we would have observed that $R_{zz}$ is a diagonal matrix and $R_{zp[2]}$ contains a K×K diagonal sub-matrix.

Note that we use the correlation between distinct PRBs or sub-bands of $R_{zp[2]}$ in order to predict and cancel the PIM signal $p_2[f]$. However, the effectiveness of such an approach is that for a specific sub-band 2, we have K dimensions in $p_2[f]$ available to suppress M dimensions of r(t) from M dimensions of $p_1(t)$. Thus, even in a noiseless scenario with perfect estimation of $W=R_{zz}^{-1}R_{zp[2]}$, we can at best cancel the PIM if and only if 2M<K.

Here, we have experienced that we can only suppress the most dominant PIM or interference terms and the rest would be considered as noise. Due to cyclo-stationarity of the signal, the power spectral density (PSD) of the PIM signal $p_2[f]$ for snapshot 1 is related to PSD of the PIM signal snapshot $p_2[f]$ for another snapshot/phase 2.

According to another embodiment, the determination of the interference suppression matrix may be performed by determining a least means square, LMS, algorithm of the difference between the received radio signals and the estimation of the interference.

While the MMSE is based on known statistics of the PIM signal, the LMS algorithm continuously updates the N×K PIM suppression matrix W based on the estimated statistics. For the LMS algorithm at OFDM symbol number m the PIM suppression matrix weights are updated as:

$$W[m+1]=W[m]+\mu z_m[f]\hat{e}_m^H[f]$$

Where $\hat{e}_m[f]=p_m[f]-(z^H[m]W[m])^T$. Note that the above terms correspond to instantaneous estimates and do not include mathematical expectation.

According to an embodiment, the interference may comprise passive intermodulation, PIM.

Using this suppression matrix has the advantage that higher order PIM signals are suppressed, thus improving the overall SINR and capacity.

Figure 5B:
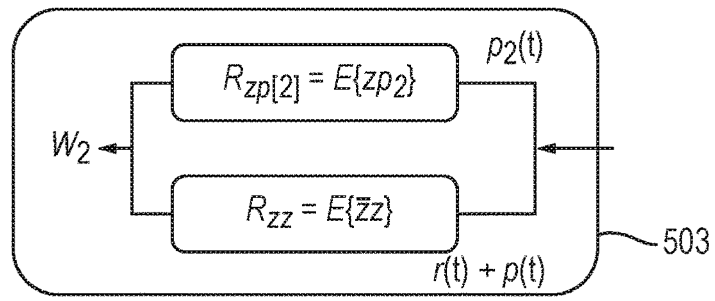
FIG. 5*b* is a block diagram illustrating the suppressor according to embodiments.

FIG. 5*b* discloses an example of a block diagram of a PIM suppressor, with reference to the example of the PIM signal and the uplink signal as shown in FIG. 5*a*. In this implementation example it estimates a PIM matrix 503 for snapshot 2 502, using the covariance and correlation of the PIM signals and the received radio signals. Thus, here the PIM signal $p_2$ of sub-band 2 502 is cross-correlated with the received radio signals across the entire band. Then a covariance is calculated between the received radio signals across the entire band. The suppressor may then be calculated from $W_2=R_{zz}^{-1}R_{zp[2]}$ as already described earlier in the text.

Figure 6B:
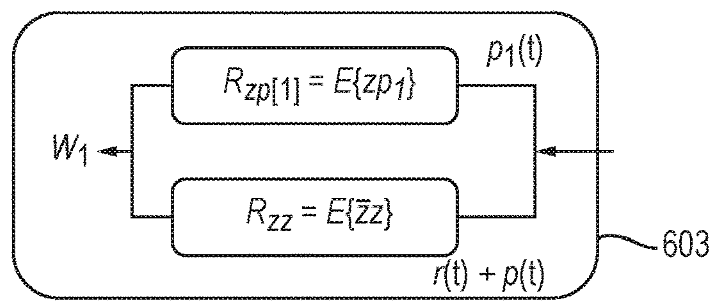
FIG. 6*b* is a block diagram illustrating the suppressor according to embodiments.

FIG. 6*b* discloses another example of a block diagram of a PIM suppressor with reference to the example of the PIM signal and the uplink signal as shown in FIG. 6*a*. In this implementation example it estimates a PIM matrix 603 for snapshot 1 601 using the covariance and correlation of the PIM and received radio signals. Thus, here the PIM signal $p_1$ of sub-band 1 601 is cross-correlated with the received radio signals across the entire band. Then a covariance is calculated between the received radio signals across the entire band. The suppressor may then be calculated from $W_1=R_{zz}^{-1}R_{zp[1]}$ as already described earlier in the text.

During multiple phases, the correlation statistics are computed/updated in each case and the PIM suppression matrix $W_1, W_2, \ldots W_x$. is estimated or updated for each sub-band x=1, 2, 3 . . . , n Updating the correlation statistics may be done during idle/guard intervals, since we do not care about the uplink received signals during the estimation phase.

In a non-limiting example, the desired UL signal to be received is present in sub-band 2 (with M sub-carriers) and corrupted by PIM $p_2(t)$:

$$z(t)=\{r(t)+p_2(t)\}+p_1(t).$$

Then, a PIM suppressor may be used i.e. N×M matrix $W_2=R_{zz}^{-1}R_{zp[2]}$ operating on z(t) or z[f] to predict and cancel PIM and compute an estimate of the uplink received signal $\hat{r}(t)$ as $$\hat{r}(t)=[z(t)-F_2^H W_2^H Fz(t)]=\{[I-F_2^H W_2^H F]\}z(t)$$

Figure 7A:
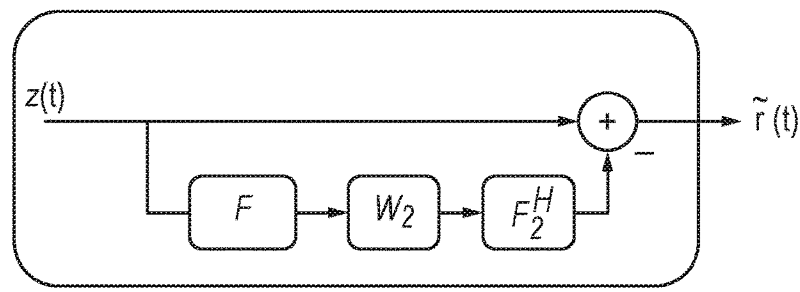
FIGS. 7*a* and 7*b* are block diagrams illustrating implementations of the suppressor in baseband according to embodiments.
Figure 7B:
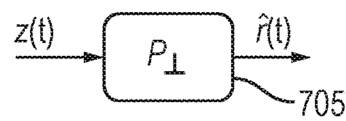

The overall operation may be implemented in the baseband in either of these two stages—as shown in the block diagrams of FIG. 7*a* and FIG. 7*b* according to embodiments. In FIG. 7*b*, the expression may be seen as a projection operation which transfers the high dimension signal z(t) reduced number of dimensions represented by $\hat{r}(t)$ with $P_\perp=[I-F_2^H W_2^H F]$ being an N×N Projection matrix 705.

Such as $\hat{r}(t)=[I-F_2^H W_2^H F]z(t)=P_\perp z(t)$

Thus, FIG. 7*b* is illustrating the projection matrix 705 transforming PIM signals from the UL sub-band to other orthogonal bands to mitigate PIM.

FIG. 7*a* is illustrating the frequency domain sidelobe arrangement to mitigate PIM. In FIG. 7*a*, it estimates interference along the desired UL sub-band and subtracts them. Thus, FIG. 7*a*, shows an equivalent operation as shown in FIG. 7*b*.

According to an example, during training phase 1 (with desired UL signal occupying sub-band 1), we obtain the second order spectral characteristics of the PIM present in sub-band 2. Since this operation gives a partial representation of the PIM signal, we refer to this operation as obtaining a snapshot of the PIM signal (interference signal). We repeat the same operation for estimation in phase 2 and get another snapshot of the PIM signal. After such multiple estimation phases, we can get the statistical relationship of the entire PIM (interference) signal. In a multi-antenna context, computing PIM (interference) snapshots can be extended to distinct antennas operating on sub-band signals to get the wideband PIM spectral characteristics.

Further, in some aspects, the suppression matrix 804, 904, 911 may operate on sub-bands of the received radio signals from a single antenna or multiple antennas to obtain the estimate of the desired signal. According to embodiments, this will now be described with reference to FIGS. 8 and 9.

According to an embodiment, the interference suppression matrix may be operating on distinct frequency sub-bands of the received radio signals from a specified antenna to obtain a low-resolution estimate of the desired signal.

Figure 8:
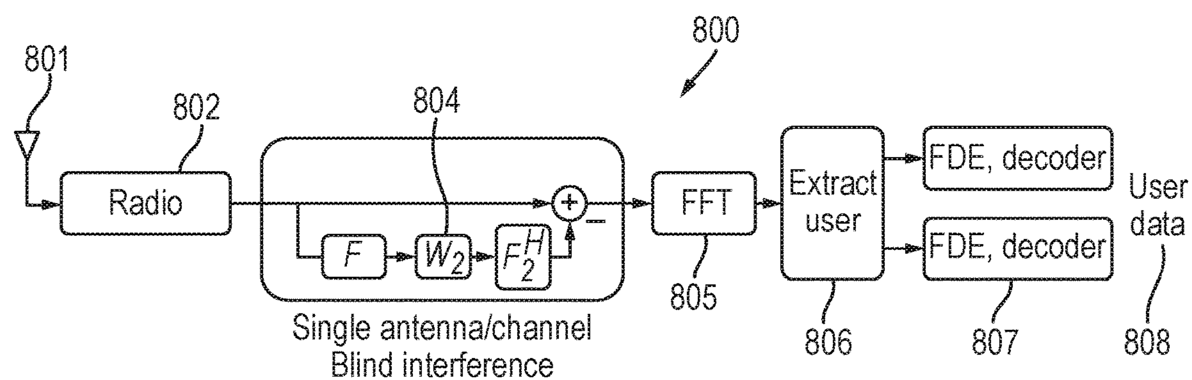
FIG. 8 is a block diagram illustrating implementation of the suppressor in a single antenna system according to an embodiment.

Thus, in a single antenna system, the interference (or PIM) in frequency sub-bands comprising the desired user (UL) signals are suppressed as shown in FIG. 8.

FIG. 8 is an illustration according to the embodiment of the single antenna. It illustrates the interference suppression without knowing the downlink signal (blind) in single (or specified) antenna context. In this single antenna case, 800, during the operation we only consider signals from a given antenna 801 to suppress interference with a PIM suppressor $\underline{W}$ 804 which is an $N \cdot N_r \times N_r \cdot K$ matrix. Wideband time domain I-Q baseband signals are used to estimate and suppress/cancel the contribution of the interference along the desired sub-band. This operation is done before a FFT operation 805 in the baseband receiver chain in uplink. It will be appreciated that the control device 200 has knowledge of the desired sub-band. Subsequently, the user signals (UL) are extracted 806, equalized and decoded 807 to obtain desired user (UL) data 808.

According to embodiments, the interference suppression matrix may be jointly operating on all frequency bands of the received radio signals from multiple antennas to obtain a high-resolution estimate of the desired signal.

Figure 9A:
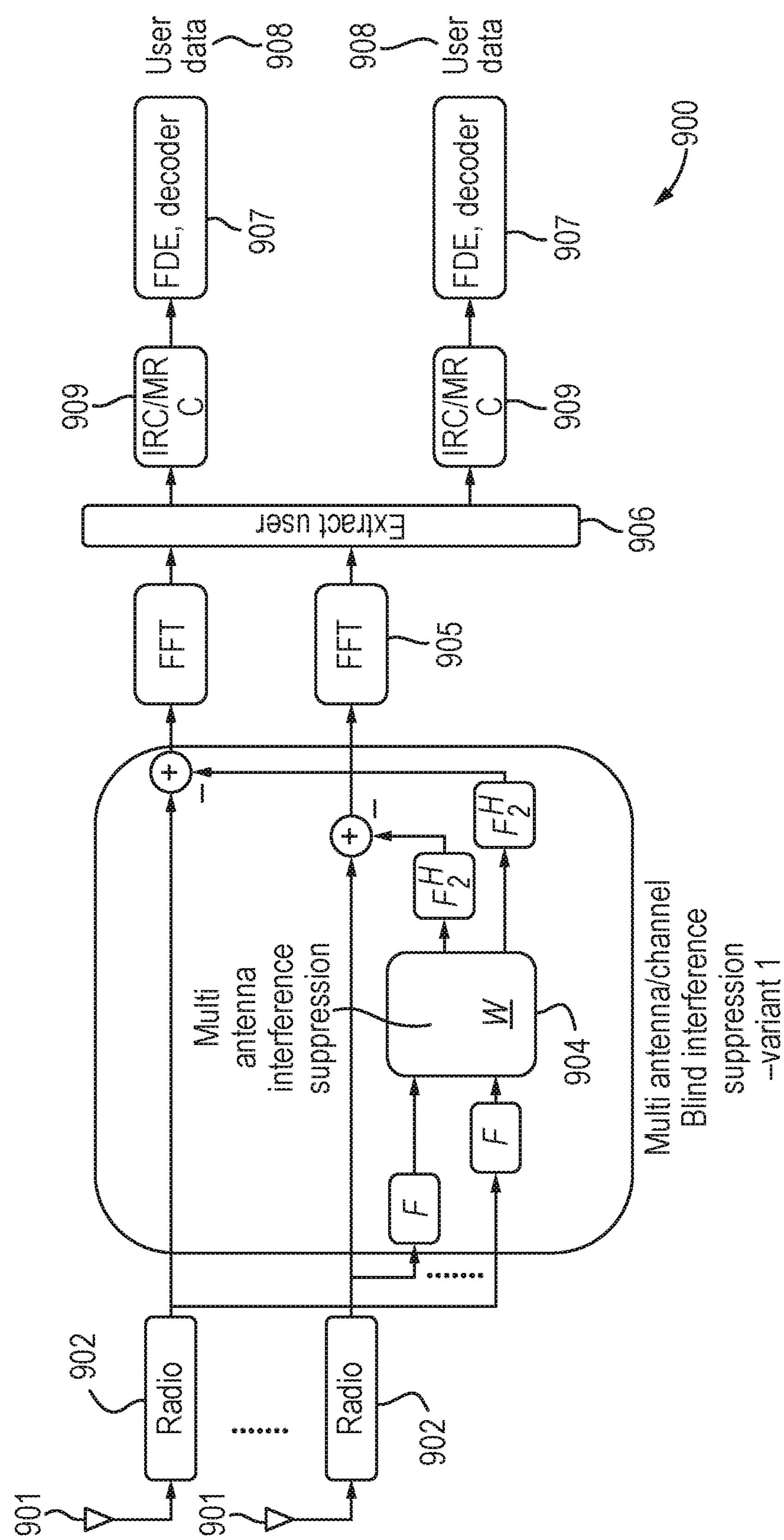
FIGS. 9*a* and 9*b* are block diagrams illustrating examples of implementation of the suppressor in a multi-antenna system according to embodiments.
Figure 9B:
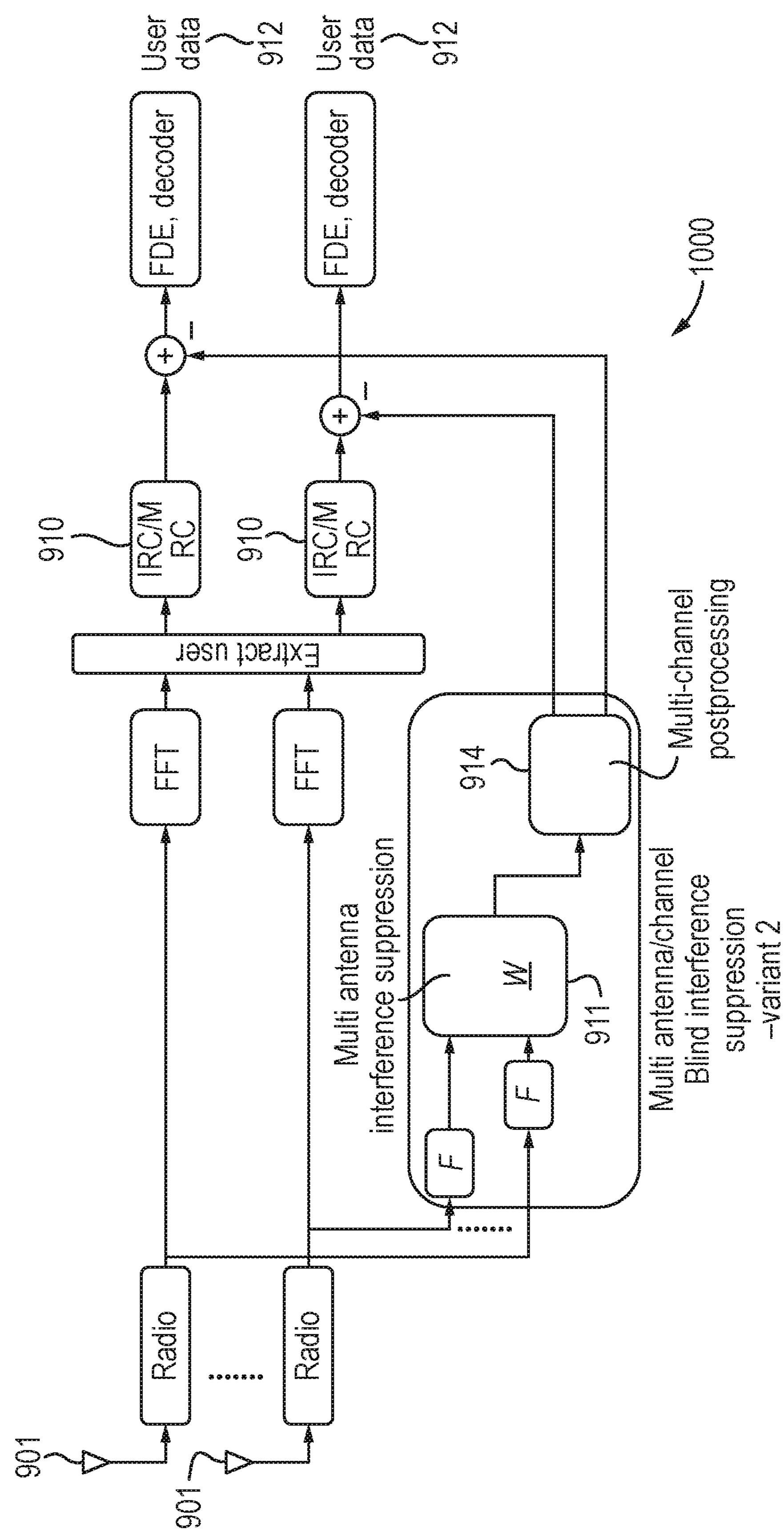

FIG. 9*a* and FIG. 9*b* is illustrating the multi-antenna set-up according to embodiments. In the multi-antenna set-up, 900, 1000, the blind interference suppression is performed by combining the received signals from the all antennas 901 to suppress interference and PIM in a given antenna. Processing multiple channels simultaneously would lead to improved performance at the cost of increase in overall complexity. The blind interference suppression can be achieved in ways, where the multi-antenna signals are combined either on all received radio signals or postprocessed and combined after or with Interference Rejection Combining (IRC) processing 909, 910, as shown in the variants shown in FIGS. 9*a* and 9*b*. The IRC processing is in a 'standard' receiver used to suppress interference, which in contrast to Maximum Ratio Combining (MRC) receiver maximize received power and suppress interference. In this set up we use $N_r$ antennas and N subcarriers. For both variants, in the simplest form, the multi-channel (multi-antenna) PIM (or interference) suppressor $\underline{W}$ is an $N \cdot N_r \times N_r \cdot K$ matrix 904, 911.

In FIG. 9*a* and variant 1 of multi-antenna interference suppressor, the wideband time domain signals from all antennas are combined with $\underline{W}$ before the FFT operation 905 to suppress interference in desired sub-band. Based on input from a scheduler, the user signals are extracted 906, followed by IRC or MRC processing 909 to either reject interference or maximize signal to noise ratio respectively. Note that the complex matrix multiplication can be simplified by choosing only the entries of $\underline{W}$ that exceed a specific threshold.

As an alternative, consider variant 2, 1000, of multi-antenna interference suppressor shown in FIG. 9*b*. In this case, the wideband time domain signals from all antennas 901 are combined with $\underline{W}$ 911 followed by further postprocessing 914 to suppress interference. It will be appreciated that post-processing 914 involves extracting user signals 913, combining with IRC/MRC 910 and eventually obtaining desired user (UL) data 912. In this case, the multi-channel PIM suppression solution also performs user domain processing, and subsequently cancels interference and PIM contributions. The advantage with this approach is that, the constraints/requirements for IRC/MRC 910 can be customized separately, either with the multi-antenna post-processing part or along the standard IRC block. Additionally, depending on user load and requirements—this approach can be realized with reduced complexity.

It will be appreciated that the term frequency sub-bands may be mentioned as just combination of sub-carriers or combination of physical resource blocks (PRBs). It will also be appreciated that even though FIG. 9 only show two antennas it may as well be applied for multiple antennas. By the term "desired signal" or "desired user data" or "user data" is hereby meant the same as the "desired UL signal".

Advantageously, the proposed technology exploits multiple wideband signals observed in a multi-antenna context and with increased degrees of freedom available now, leading to improved interference suppression. The performance improvement is comparable to improvements we obtain as we transition from single to multi-antenna/MIMO communications such as improved capacity and better interference suppression. Moreover, with the proposed technology, interference or PIM do not need be synchronized to the desired UL signal and the DL signal do not need to be known when mitigating interference. Therefore, this is an efficient suppression technique to be used solely or as a complement to previously known suppression techniques.

Figure 10:
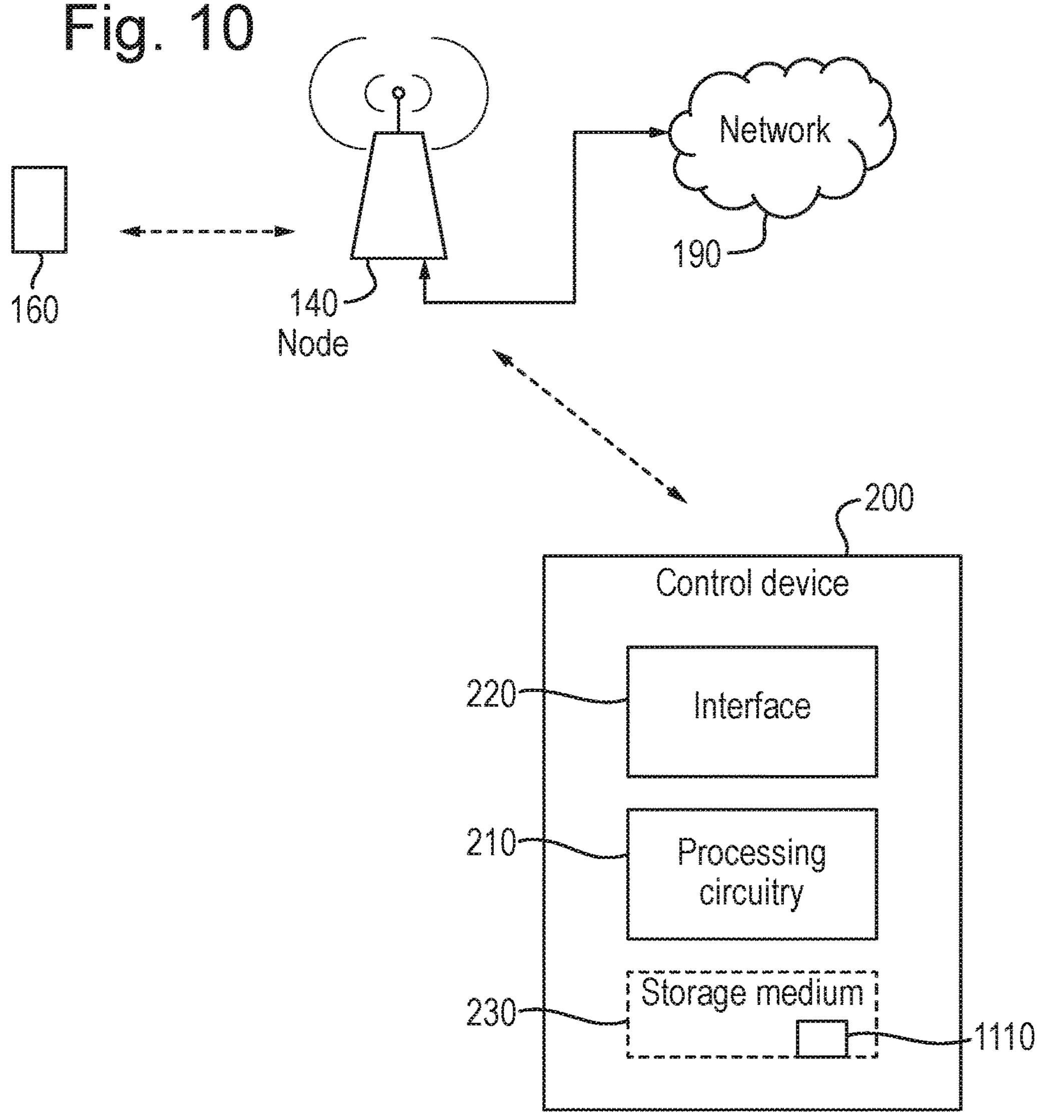
FIG. 10 is a schematic diagram showing a network comprising a network node, a control device and a wireless device according to an embodiment.

FIG. 10 schematically illustrates, in terms of a number of functional units, a wireless network, comprising a network node 140, a wireless device 160 and a control device 200 where they communicate through a network 190. For simplicity the wireless network of FIG. 10 only depicts network 190, network node 140 and a wireless device 160 and a control device 200 connected to the network node 140. However, in practice, a wireless network may further include any additional elements suitable to support communication between wireless devices or between a wireless device and another communication device, such as a landline telephone, a service provider, or any other network node or end device. Of the illustrated components, network node 140 and control device 200 are depicted with additional detail. The wireless network may provide communication and other types of services to one or more wireless devices to facilitate the wireless devices' access to and/or use of the services provided by, or via, the wireless network. Only a single network is described in the FIG. 10 for simplicity, but it may comprise several networks as for example both a core network, a radio access network and a service network. Processing circuitry 210 is provided using any combination of one or more of a suitable central processing unit (CPU), multiprocessor, microcontroller, digital signal processor (DSP), etc., capable of executing software instructions stored in a computer program product 1110 (as in FIG. 11), e.g. in the form of a storage medium 230. The processing circuitry 210 may further be provided as at least one application specific integrated circuit (ASIC), or field programmable gate array (FPGA). Particularly, the processing circuitry 210 is configured to cause the control device 200 to perform a set of operations, or steps, as disclosed above. For example, the storage medium 230 may store the set of operations, and the processing circuitry 210 may be configured to retrieve the set of operations from the storage medium 230 to cause the control device 200 to perform the set of operations. The set of operations may be provided as a set of executable instructions. Thus, the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control device 200 may further comprise a communications interface 220 at least configured for communications with other entities, nodes, functions, and devices of the communications network 190, such as the radio base station 140. As such the communications interface 220 may comprise one or more transmitters and receivers, comprising analogue and digital components. The processing circuitry 210 controls the general operation of the control device 200 e.g. by sending data and control signals to the communications interface 220 and the storage medium 230, by receiving data and reports from the communications interface 220, and by retrieving data and instructions from the storage medium 230. Other components, as well as the related functionality, of the control device 200 are omitted in order not to obscure the concepts presented herein.

The control device 200 may be provided as a standalone device or as a part of at least one further device. For example, the control device 200 may be provided in a node of a radio access network or in a node of a core network. Alternatively, functionality of the control device 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. In this respect, at least part of the control device 200 may reside in the radio access network, such as in the radio access network node, for cases when embodiments as disclosed herein are performed in real time. Thus, a first portion of the instructions performed by the control device 200 may be executed in a first device, and a second portion of the instructions performed by the control device 200 may be executed in a second device; the herein disclosed embodiments are not limited to any particular number of devices on which the instructions performed by the control device 200 may be executed. Hence, the methods according to the herein disclosed embodiments are suitable to be performed by a control device 200 residing in a cloud computational environment. Therefore, although a single processing circuitry 210 is illustrated in FIG. 10 the processing circuitry 210 may be distributed among a plurality of devices, or nodes. The same applies to the computer program 1120 of FIG. 11.

Figure 11:
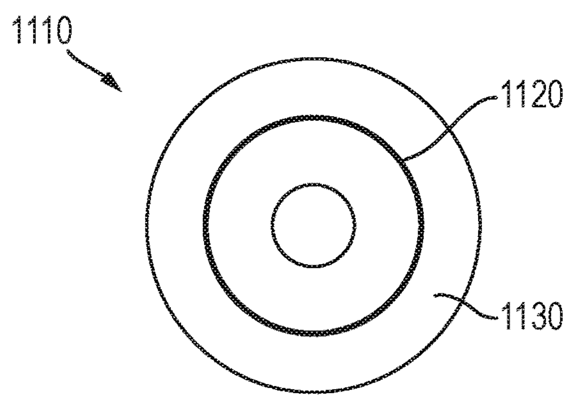
FIG. 11 shows one example of a computer program product comprising computer readable storage medium according to an embodiment.

FIG. 11 shows one example of a computer program product 1110 comprising computer readable storage medium 1130 (or also called non-transitory computer readable medium). On this computer readable storage medium 1130, a computer program 1120 can be stored, which computer program 1120 can cause the processing circuitry 210 and thereto operatively coupled entities and devices, such as the communications interface 220 and the storage medium 230, to execute methods according to embodiments described herein. The computer program 1120 and/or computer program product 1210 may thus provide means for performing any steps as herein disclosed.

In the example of FIG. 11, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

ABBREVIATIONS

At least some of the following abbreviations are used in this disclosure.

| Abbreviation | Explanation |
|---|---|
| PIM | Passive intermodulation |
| PRB | Physical resource blocks |
| MMSE | Minimum mean square error |
| LMS | Least means square |
| UE | User equipment |
| UL | Uplink |
| IRC | Interference Rejection Combining |
| MRC | Maximum Ratio Combining |

The invention claimed is:

1. A method for mitigating interference in a network node, the method being performed by a control device, the method comprising:

receiving radio signals comprising at least one desired signal and interference estimating a characteristic of the interference;

wherein the estimation comprises calculating correlation statistics of power levels of frequency sub-bands comprising the interference with frequency sub-bands comprising the received radio signals;

determining an interference suppression matrix to suppress the interference in the frequency sub-bands of the received radio signals based on the estimated characteristic of the interference;

wherein the interference suppression matrix is further determined based on information from inter-band interference observed across distinct sub-bands of the received radio signals, and applying the interference suppression matrix on the received radio signals to mitigate the interference from the received radio signals.

2. The method according to claim 1, wherein the estimation comprises correlating the interference from each of the distinct sub-bands with each of the received radio signals across the entire band to get a spectral representation of the interference.

3. The method according to claim 1, wherein the estimation comprises correlating the received radio signals across the entire band with frequency shifted versions of itself to get the spectral representation of the received radio signals.

4. The method according to claim 1, wherein the inter-band/inter-carrier interference is estimated from the loss in orthogonality of the received radio signals.

5. The method according to claim 1, wherein the determination of the interference suppression matrix is performed by minimizing the mean square error, MMSE between the received radio signals and the estimation of the interference.

6. The method according to claim 1, wherein the determination of the interference suppression matrix is performed by determining a least means square, LMS, algorithm of the difference between the received radio signals and the estimation of the interference.

7. The method according to claim 1, wherein the interference comprises passive intermodulation, PIM.

8. The method according to claim 1, wherein the interference suppression matrix is jointly operating on all frequency bands of the received radio signals from multiple antennas to obtain a high-resolution estimate of the desired signal.

9. The method according to claim 1, wherein the interference suppression matrix is operating on distinct frequency sub-bands of the received radio signals from a specified antenna to obtain a low-resolution estimate of the desired signal.

10. A computer program product comprising a non-transitory computer-readable medium storing instructions which, when executed by a computer, cause the computer to perform the method of claim 1.

11. A non-transitory computer-readable medium storing instructions which, when executed by a computer, cause the computer to perform the method of claim 1.

12. A control device for mitigating interference in a network node, the control device is configured to:

receive radio signals comprising at least one desired signal and interference;

estimate a characteristic of the interference;

wherein the estimation comprises calculating correlation statistics of power levels of frequency sub-bands comprising the interference with frequency sub-bands comprising the received radio signals;

determine an interference suppression matrix to suppress the interference in the frequency sub-bands of the received radio signals based on the estimated characteristic of the interference;

wherein the interference suppression matrix is further determined based on information from inter-band interference observed across distinct sub-bands of the received radio signals, and apply the interference suppression matrix on the received radio signals to mitigate the interference from the received radio signals.

13. The control device of claim 12, wherein the estimation comprises correlating the interference from each of the distinct sub-bands with each of the received radio signals across the entire band to get a spectral representation of the interference.

14. The control device of claim 12, wherein the estimation comprises correlating the received radio signals with frequency shifted versions of itself across the entire band to get the spectral representation of the received radio signals.

15. The control device of claim 12, wherein the inter-band/inter carrier interference is estimated from the loss in orthogonality of the received radio signals.

16. The control device of claim 12, wherein the determination of the interference suppression matrix is performed by minimizing a mean square error, MMSE between the received radio signals and the estimation of the interference.

17. The control device of claim 12, wherein the determination of the interference suppression matrix is performed by determining a least means square, LMS, algorithm of the difference between the received radio signals and the estimation of the interference.

18. The control device of claim 12, wherein the interference comprises passive intermodulation, PIM.

19. The control device of claim 12, wherein the interference suppression matrix jointly is operating on all frequency bands of the received radio signals from multiple antennas to obtain a high-resolution estimate of the desired signal.

20. The control device of claim 12, wherein the interference suppression matrix is operating on distinct frequency sub-bands of the received radio signals from a specified antenna to obtain a low-resolution estimate of the desired signal.

21. A control device for mitigating interference in a network node, the control device comprising processing circuitry, the processing circuitry being configured to cause the control device to:

receive radio signals comprising at least one desired signal and interference;

estimate a characteristic of the interference;

wherein the estimation comprises calculating correlating statistics of power levels of frequency sub-bands comprising the interference with frequency sub-bands comprising the received radio signals;

determine an interference suppression matrix to suppress the interference in the frequency sub-bands of the received radio signals based on the estimated characteristic of the interference;

wherein the interference suppression matrix is further determined based on information from inter-band interference observed across distinct sub-bands of the received radio signals, and apply the interference suppression matrix on the received radio signals to mitigate the interference from received radio signals.

* * * * *